United States Patent
Wischhof et al.

(10) Patent No.: US 9,466,314 B2
(45) Date of Patent: Oct. 11, 2016

(54) METHOD FOR CONTROLLING FUNCTIONAL DEVICES IN A VEHICLE DURING VOICE COMMAND OPERATION

(75) Inventors: Lars Wischhof, Ingolstadt (DE); Matthias Bezold, Buckenhof (DE)

(73) Assignee: AUDI AG, Ingolstadt (DE)

(*) Notice: Subject to any disclaimer, the term of this patent is extended or adjusted under 35 U.S.C. 154(b) by 194 days.

(21) Appl. No.: 14/238,020

(22) PCT Filed: Jun. 23, 2012

(86) PCT No.: PCT/EP2012/002659
§ 371 (c)(1),
(2), (4) Date: Feb. 10, 2014

(87) PCT Pub. No.: WO2013/020615
PCT Pub. Date: Feb. 14, 2013

(65) Prior Publication Data
US 2014/0200898 A1    Jul. 17, 2014

(30) Foreign Application Priority Data
Aug. 10, 2011    (DE) .................. 10 2011 109 932

(51) Int. Cl.
*G10L 21/00* (2013.01)
*G10L 21/16* (2013.01)
*B60R 16/037* (2006.01)
*G10L 15/22* (2006.01)

(52) U.S. Cl.
CPC .......... *G10L 21/16* (2013.01); *B60R 16/0373* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 6,081,780 A * | 6/2000 | Lumelsky | G10L 13/08 704/260 |
| 6,654,720 B1 | 11/2003 | Graham et al. | |
| 7,711,358 B2 * | 5/2010 | Ross | G10L 15/30 379/88.01 |
| 7,870,142 B2 * | 1/2011 | Michmerhuizen | G10L 13/08 701/36 |
| 8,554,567 B2 * | 10/2013 | Spier | H04L 65/1063 704/231 |
| 8,577,543 B2 * | 11/2013 | Basir | B60R 16/0373 455/563 |
| 8,811,938 B2 * | 8/2014 | Paek | G06F 1/1632 340/576 |
| 8,996,386 B2 * | 3/2015 | Alasry | G10L 15/06 345/1.1 |
| 9,058,705 B2 * | 6/2015 | Basir | B60R 16/0373 |
| 2002/0069063 A1 | 6/2002 | Buchner et al. | |
| 2004/0193420 A1 * | 9/2004 | Kennewick | G06F 17/30654 704/257 |

(Continued)

FOREIGN PATENT DOCUMENTS

| | | |
|---|---|---|
| CN | 1815556 | 8/2006 |
| DE | 4427444 | 2/1996 |

(Continued)

OTHER PUBLICATIONS

Chinese Office Action for related Chinese Patent Application No. 201280038963.X, issued on Jun. 12, 2015, 3 pages.

(Continued)

*Primary Examiner* — Satwant Singh
(74) *Attorney, Agent, or Firm* — Staas & Halsey LLP

(57) ABSTRACT

For retrofitting an infotainment system of a motor vehicle which has the option of operating using voice commands, such voice commands are subsequently defined in an SCXML file. The voice commands are assigned state transitions, which are intended to run through the functional devices after the corresponding voice command is received. The SCXML file is interpreted by an interpreter.

20 Claims, 1 Drawing Sheet

(56) References Cited

U.S. PATENT DOCUMENTS

| | | | |
|---|---|---|---|
| 2005/0193092 A1* | 9/2005 | Habermas | G11B 27/329 709/219 |
| 2006/0046769 A1* | 3/2006 | Arun | H04M 1/2725 455/550.1 |
| 2006/0106608 A1 | 5/2006 | Weinmeister | |
| 2007/0288242 A1 | 12/2007 | Spengler et al. | |
| 2008/0080678 A1* | 4/2008 | Ma | H04M 3/4936 379/88.16 |
| 2008/0103779 A1 | 5/2008 | Huang et al. | |
| 2008/0162136 A1 | 7/2008 | Agapi et al. | |
| 2008/0208594 A1 | 8/2008 | Cross et al. | |
| 2009/0055178 A1 | 2/2009 | Coon | |
| 2014/0163809 A1* | 6/2014 | Basir | B60R 16/0373 701/31.5 |
| 2014/0329487 A1* | 11/2014 | Paek | G06F 1/1632 455/404.1 |

FOREIGN PATENT DOCUMENTS

| | | |
|---|---|---|
| DE | 19818262 | 10/1999 |
| DE | 19942869 | 3/2001 |
| DE | 69712485 | 12/2002 |
| DE | 60217579 | 11/2007 |
| DE | 102006006551 | 9/2008 |
| DE | 102011109932 | 8/2011 |
| EP | 0 911 808 | 4/1999 |
| EP | 0952040 | 10/1999 |
| EP | 1184841 | 3/2002 |
| EP | 1 868 183 | 12/2007 |
| EP | 2 028 061 | 2/2009 |
| EP | 2012/002659 | 6/2012 |

OTHER PUBLICATIONS

Lin Lin et al., "Orchestration in Web Services and Real-Time Communications," IEEE Communications Magazine, Jul. 2007, pp. 44-50.
German Office Action for German Priority Patent Application No. 10 2011 109 932.1, issued Mar. 23, 2012, 6 pages.
English Language International Search Report for PCT/EP2012/002659, mailed Sep. 28, 2012, 3 pages.
European Office Action for related European Patent Application No. 12734801.9, issued Jul. 17, 2015, 5 pages.
English Language International Preliminary Report on Patentability for PCT/EP2012/002659, mailed Feb. 13, 2014, 12 pages.
Chinese Office Action dated Nov. 23, 2015 from Chinese Patent Application No. 201280038963.X, 5 pages.

* cited by examiner

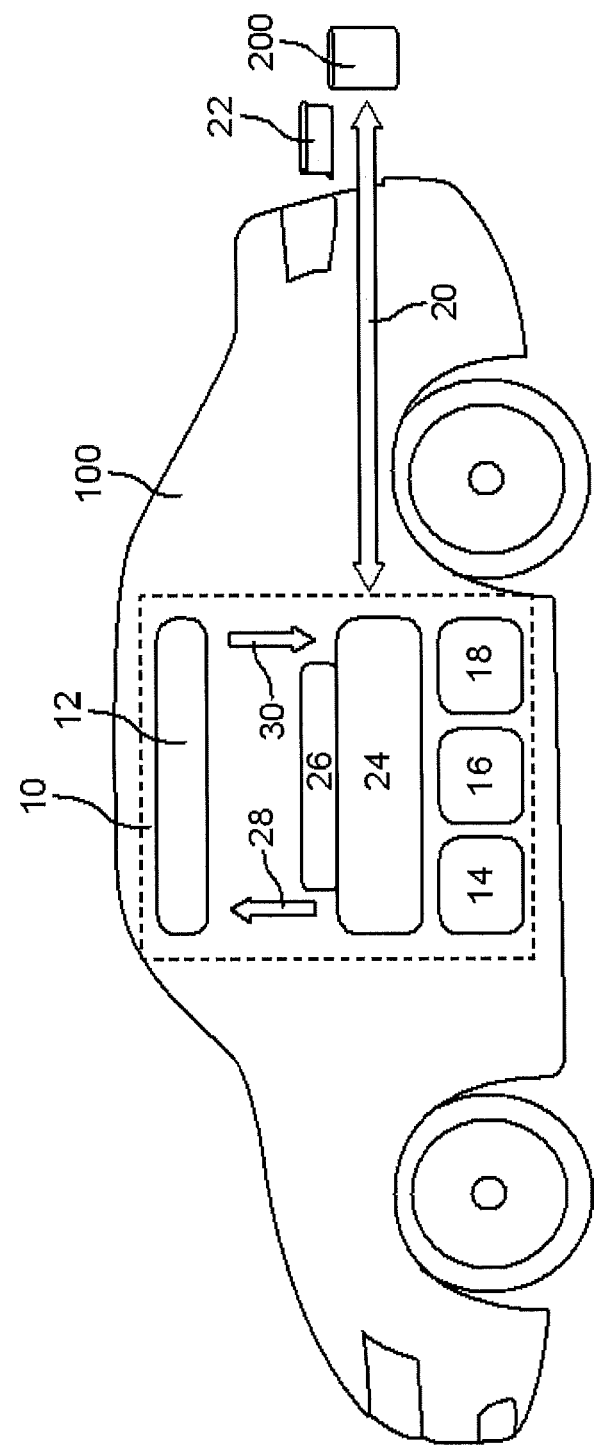

METHOD FOR CONTROLLING FUNCTIONAL DEVICES IN A VEHICLE DURING VOICE COMMAND OPERATION

CROSS REFERENCE TO RELATED APPLICATIONS

This application is based on and hereby claims priority to International Application No. PCT/EP2012/002659 filed on Jun. 23, 2012 and German Application No. 10 2011 109 932.1 filed on Aug. 10, 2011, the contents of which are hereby incorporated by reference.

BACKGROUND

The invention relates to a method for controlling functional devices in a vehicle by a device which can be operated via voice commands.

In a motor vehicle, a so-called infotainment system can process different types of data depending on functionality. For example, the infotainment system comprises an audio device for the acoustical reproduction of audio data, whether these are data from a data medium or those of a radio program which are transmitted wirelessly; the infotainment system also comprises a navigation device which outputs map data via a display device and places them in relation to a current position, possibly also a target position, of the vehicle; the infotainment system can also comprise a hands-free talking device which enables the vehicle device to be coupled to a mobile radio telephone.

The device, with the aid of which such devices of the vehicle can be controlled, can comprise operating elements such as, for instance, keys, the operation by voice input, that is to say voice commands, being predominant in the present case: there is thus a microphone and a device for analyzing the data recorded by the microphone in the sense of voice recognition.

For the purpose of voice recognition, a relatively large amount of effort must be made relating to the hardware to be made available, especially also the memory, apart from the processor, and a particular computing time must be made available for a particular processor. So that the effort is not allowed to grow excessively, the remedy has hitherto been to provide voice operation only to a limited extent, namely by defining a number of voice commands which provide for operation. In this manner, the range of functions of the (voice control) system must be specified precisely at the time of delivery of the vehicle. It is equally not possible to flexibly specify a new functionality on a mobile radio telephone even if the functionalities are provided via the latter.

It would be nice to be able to define new functionalities at a later time. This has previously been possible to a restricted extent by utilizing web browsers (for example by utilizing the HTML and WAP formats). Using such web browsers, however, only makes it possible to implement a voice output but not a voice input for providing novel ways of control (new events in the case of the provision of new functions).

US 2004/0193420 A1 describes a method for processing voice commands in a motor vehicle. In this method, corresponding files are exchanged in which a method of control for a functional device is stored. The files can be received by a device different from the vehicle. The functional device can thus be controlled via the voice command.

Furthermore, US 2002/0069063 A1 describes a home network having digital interfaces. Devices can be coupled to the digital interfaces and controlled via voice commands.

In addition, a control system for aircraft which can be controlled via voice inputs is known from US 2007/0288242 A1. The control system can comprise a host processor which is coupled to a database for storing and receiving voice commands.

DE 199 42 869 A1 describes a method for operating a voice-controlled device in motor vehicles, in which method the voice commands are assigned to a device function in the motor vehicle via a speech pattern comparison. In this context, data or functions arriving via telematics services can also be transcribed ad hoc into voice-command-controllable speech patterns.

From US 2008/0103779 A1, a method for receiving voice commands is known by which vehicle functions can be controlled.

Finally, US 2009/0055178 A1 describes a method for acquiring voice commands in a motor vehicle. In this method, in addition to the voice command, a position is also determined from which the voice command emanates.

SUMMARY

It is thus one possible object to provide a method of the type initially mentioned which is especially suitable for retrofitting a preexisting system, especially the infotainment system.

The inventors propose a method for controlling functional devices in a vehicle by a device which can be operated via voice commands. The method thus comprises the following:
  receiving a file with data which specify at least one voice command and, in association therewith, a method of control for a functional device, and the file being received by the vehicle from a device different from the vehicle,
  receiving a voice input by the vehicle, especially by the device,
  comparing the voice input with the at least one voice command from the file and, if a correspondence with one of the voice commands is found in accordance with a predetermined criterion,
  controlling the functional device in accordance with the method of control belonging to the one of the voice commands with which the correspondence is found, wherein
  the file is received by a mobile radio device (200) and—the file has an XML format, preferably an SCXML format, and is interpreted by an interpreter, and
  an application which is stored on the mobile radio device and can be executed there is accessed via at least one of the voice commands.

In the proposed method, the voice command as such, and the matter to be effected following this voice command, is thus conveyed to the vehicle or to the device of the vehicle, respectively, via a file. By receiving a file in the context of retrofitting the vehicle, in which voice commands could already have been stored previously, the previous set of voice commands can be extended, especially subsequently extended.

In a preferred embodiment, a state related to the device or a functional device to be controlled by the device is allocated to at least a part of the voice commands. Before comparing, the state is determined. Then comparing takes place only with those voice commands to which the same state is allocated, or so-called general voice commands to which no specific state at all is allocated. In order to facilitate the voice recognition, it is taken into consideration here that in a particular state, only a restricted number of voice commands is appropriate so that only this restricted type of voice commands needs to be recognized. The state is followed by the method of control, that is to say a so-called event which changes the state.

This can then result in a further state and receiving a voice input and of comparing and subsequently controlling can be performed again. In this manner, a complex voice dialogue can be realized which is accompanied by complex operating processes within the flexible function subsequently loaded.

The received file has an XML format, preferably an SCXML format, and the file is then interpreted in a manner known per se by an interpreter which is a part of the device which can be operated via voice commands: an interpreter converts commands from an XML file immediately into control signals. The XML format is particularly suitable for conveying the voice commands and for that which is to be effected by the voice commands. This is because the XML format is independent of platform and can be processed therefore by different systems.

In an alternative, the pronunciation of the at least one voice command is specified by the data, e.g. in a type of phonetic language. As an alternative, the notation of the at least one voice command is specified by the data so that the device can infer the pronunciation by a basic grammar or conversely can infer the pronunciation of a particular voice command by the pronunciation. Both alternatives are advantageous depending on context. Specifying the pronunciation by the data has the advantage that the device can access the data directly; on the other hand, specifying the notation of the voice command can be implemented somewhat more simply.

In a preferred variant, the file is received by a server external to the vehicle. Such servers can be provided by the manufacturer (OEM), for example by the manufacturer of the vehicle who can perform updates in the functionalities of the vehicle with the aid of the file conveyed. The vehicle can thus be upgraded following a simple inquiry from the manufacturer. There is thus a simple addressee for the vehicle to whom one can turn for upgrading.

Naturally, other persons and companies can also be responsible for such a server.

In this variant, the file is received preferably via a mobile radio link, e.g. UMTS or LTE, namely especially via the Internet. A file to be downloaded can be selected especially easily via the Internet, especially in conjunction with a device of the infotainment system which can be operated easily by an operator. To download the files, voice commands do not need to be necessarily used and keys and other haptic operating elements can be operated.

According to the proposal, the file is received by a mobile radio device. Upgrading is known as being common to a high degree especially in the case of mobile radio devices. Using a mobile radio device, so-called applications (apps) can be downloaded. If it is then required to operate these apps from the vehicle, that is to say via the man-machine interface of the vehicle including the device which can be operated via voice commands, only the file needs to be generated (for instance in the XML format) by the mobile radio device and conveyed or simply forwarded to the vehicle; the application deposited in the mobile radio device can then also be controlled from the vehicle. The functional device is then thus part of the mobile radio device, but controlling takes place in the vehicle.

In this variant, the data are received preferably via a wireless link different from a mobile radio link; this is because mobile radio devices can be coupled to the vehicle via corresponding interfaces, for example via Bluetooth®.

BRIEF DESCRIPTION OF THE DRAWINGS

These and other objects and advantages of the present invention will become more apparent and more readily appreciated from the following description of the preferred embodiments, taken in conjunction with the accompanying drawing of which:

FIG. 1 illustrates the software modules necessary for implementing one embodiment of the proposed method and the exchange processes between these.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

A vehicle designated by 100 overall has an infotainment system 10 delimited by a dashed line. In this system, a voice input which can be interpreted as a voice command due to voice recognition is provided for especially via a man-machine interface. The infotainment system 10 also includes further interfaces, for example an interface 14 to a navigation device, an interface 16 for a telephone device, an interface 18 for a multimedia device etc.

In the infotainment system 10, a finite number of voice commands are stored for the voice control which correspond to so-called events, that is to say processes which alter an (informational) state of the infotainment system or of a device controlled via the interfaces 14, 16, 18, respectively, of the latter into a corresponding different state.

In the present case, the number of commands is to be extended in order to provide new functionalities in the infotainment system 10. For this reason, a data link 20 is established between the infotainment system 10 of a device 200 different from the vehicle 100. In one variant, the device can be a server external to the vehicle, in another variant, it can be a mobile radio telephone which is carried along in the vehicle 100. The vehicle 100 or its infotainment system 10, respectively, then sends an inquiry to the device 200 whereupon the latter sends an SCXML file 22 to the infotainment system 10, that is to say a text file. The SCXML file comprises information relating to at least one name of a command which, in the present case, is to be deliverable via voice control, that is to say a voice command, and in addition to each voice command, an event, that is to say a change in state.

In the infotainment system 10, an interpreter 24, which interacts with a digital interface 26 for the man-machine interface, interprets the SCXML file. According to the arrow 28, the interpreter 24 conveys a table to the interface 12 which allocates the voice commands to the events to be implemented. A voice command is then input via the interface 12. The interface 12 then determines initially the existing (informational) state because, if it is a matter of state transitions, it must be clear initially which states are used as a basis. Now, state transitions (events) which are based on the prevailing state are defined only with respect to a limited number of voice commands; only these are subsequently included, together with possibly generally defined voice commands (such as, e.g., the always valid "abort" or the like). The interface 12 then compares the voice input with the available (that is to say valid in the present state) voice commands and finds out the voice command to which the voice input corresponds. According to the arrow 30, corresponding information is conveyed to the interpreter 24 which then accordingly causes state transitions (events), especially by using the interfaces.

Thus, the vehicle 100 or its infotainment system 10, respectively, can be extended by additional information by conveying the SCXML file 22.

In the case where the device 200 is a server external to the vehicle, this server can be provided by the manufacturer of the vehicle 100. For example, with each start of the vehicle 100 or of functional units thereof or at repetitive time intervals or after particular driving distances or driving times, a vehicle 100 or its infotainment system 10, respectively, can make a request to the external server 200 so that current functionalities are always kept available in the vehicle 100.

The device 200 can also be a mobile radio telephone which is coupled to the infotainment system 10 via Bluetooth®, WLAN, USB cable, Iphone® cable or the like. In this case, conveying the SCXML file 22 enables apps (applications) stored on the mobile radio telephone and executable there to be accessed via voice commands which are input via the infotainment system 10 and were previously not known.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for controlling a functional device in a vehicle and for controlling a mobile radio device external to the vehicle, comprising:
   receiving, by the vehicle, a file having data, the file being received from a source external to the vehicle;
   interpreting, by the vehicle, the data of the file, to obtain a plurality of application voice commands, each application voice command having a corresponding method of control for an application stored on the mobile radio device;
   storing the application voice commands;
   storing vehicle voice commands, each vehicle voice command having a corresponding method of control for a functional device in the vehicle;
   receiving, by the vehicle, a first voice input;
   comparing, by the vehicle, the first voice input with voice commands selected from the group consisting of the application voice commands and the vehicle voice commands;
   matching the first voice input with a selected application voice command when a correspondence is found;
   controlling the application stored on the mobile radio device in accordance with the method of control corresponding to the selected application voice command;
   receiving, by the vehicle, a second voice input;
   comparing, by the vehicle, the second voice input with voice commands selected from the group consisting of the application voice commands and the vehicle voice commands;
   matching the second voice input with a selected vehicle voice command when a correspondence is found; and
   controlling the functional device in the vehicle in accordance with the method of control corresponding to the selected vehicle voice command,
   wherein the comparing the first voice input comprises:
   comparing the first voice input with only those application voice commands which have a state which is the same as a current state of the mobile radio device; and
   comparing the first voice input with voice commands having no specific state allocated.

2. The method as claimed in claim 1, wherein
   state change commands are included in the voice commands selected from the group consisting of the application voice commands and the vehicle voice commands,
   each state change command corresponds to a method of control in which an old state is altered to produce a new state,
   a functional device state change command corresponds to a method of control in which the functional device is changed from a first state to a second state, and
   the method further comprises:
   performing state investigation to determine that a current state of the functional device is different from the first state; and
   excluding the functional device state change command when comparing the second voice input with the voice commands.

3. The method as claimed in claim 1, wherein
   state change commands are included in the voice commands selected from the group consisting of the application voice commands and the vehicle voice commands,
   each state change command corresponds to a method of control in which an old state is altered to produce a new state,
   an application state change command corresponds to a method of control in which the application is changed from a first state to a second state, and
   the method further comprises:
   performing state investigation to determine that a current state of the application is different from the first state; and
   excluding the application state change command when comparing the first voice input with the voice commands.

4. The method as claimed in claim 1, wherein the data specifies a pronunciation for each application voice command.

5. The method as claimed in claim 1, wherein the data specifies a notation for each application voice command which infers a pronunciation of the corresponding application voice command.

6. The method as claimed in claim 1, wherein
   the file is generated by a server, and
   the file is conveyed from the server to the vehicle over a wireless network.

7. The method as claimed in claim 1, wherein
   the file is received from the mobile radio device,
   the mobile radio device is a mobile radio telephone,
   the mobile radio device is coupled to the vehicle via at least one of a Bluetooth® interface, a WLAN interface, a USB cable or an Iphone® cable.

8. The method as claimed in claim 1, wherein
the file is received from the mobile radio device,
the mobile radio device functions as a mobile radio telephone via a mobile radio link, and
the file is received via a wireless link different from the mobile radio link.

9. The method as claimed in claim 1, wherein the file has an XML format.

10. The method as claimed in claim 1, wherein the file has an SCXML format.

11. The method as claimed in claim 1, wherein the file is received from the source through the internet.

12. The method as claimed in claim 1, wherein the file includes a new voice command different from voice commands stored for voice control in the vehicle, and the new voice command included in the file provides a new method of control for the mobile radio device.

13. The method as claimed in claim 1, further comprising:
generating, by the vehicle, a table which allocates the application voice commands from the file to a method of control to be implemented by the mobile radio device.

14. The method as claimed in claim 1, wherein
the file is generated by the mobile radio device, and
the file is conveyed from the mobile radio device to the vehicle.

15. The method as claimed in claim 1, wherein
the vehicle has a plurality of functional devices,
a first vehicle voice command is used to control a first functional device,
a second vehicle voice command is used to control a second functional device.

16. The method as claimed in claim 1, wherein
controlling the application stored on the mobile radio device comprises sending a signal from the motor vehicle to the mobile radio device.

17. A method for controlling a mobile radio device, comprising:
storing an application on the mobile radio device;
transmitting a file having an SCXML format from the mobile radio device to a motor vehicle, the file having data specifying:
a plurality of voice commands, each voice command having a corresponding method of control for the application stored on the mobile radio device,
a corresponding pronunciation for each voice command for selecting the voice command using a voice input, and
a state indicating a current state of the mobile radio device for selecting the voice command using the voice input;
receiving at the mobile radio device, an instruction signal from the motor vehicle, the instruction signal instructing the mobile radio device to implement the method of control corresponding to a voice command selected based on a comparison of the voice input with only voice commands from the file which have a state which is the same as the current state of the mobile radio device and with voice commands having no specific state allocated; and
controlling the application to implement the method of control corresponding to the selected voice command.

18. The method as claimed in claim 17, wherein
a plurality of applications are stored on the mobile radio device, and
for each voice command, the data of the file specifies a target application stored on the mobile radio device which the method of control is to be performed.

19. The method as claimed in claim 17, wherein
the voice commands comprise state change commands, each state change command corresponding to a method of control in which an old state is altered to produce a new state,
a first state change command corresponds to a method of control in which the application is changed from a first state to a second state, and
the method further comprises:
performing state investigation, at the mobile radio device, to determine that a current state of the application is different from the first state; and
sending a feedback signal from the mobile radio device to the motor vehicle, the feedback signal informing the motor vehicle that the current state of the application is different from the first state.

20. A method for controlling functional devices in a vehicle by a device which can be operated via voice commands, comprising:
receiving a file with data which specify at least one voice command and, in association therewith, specify a method of controlling a functional device from a device different from the vehicle by the vehicle,
receiving a voice input by the device,
comparing the voice input with at least one voice command from the file and, if a correspondence with one of the voice commands is found in accordance with a predetermined criterion,
controlling the functional device in accordance with the method of control belonging to the one of the voice commands with which a correspondence is found,
wherein
the file has an SCXML format, and is interpreted by an interpreter of the device,
the file is generated by a mobile radio device and conveyed to the vehicle, and
applications stored on the mobile radio device, where they can be executed, are accessed via voice commands,
wherein the comparing the voice input comprises:
comparing the voice input with only application voice commands from the file which have a state which is the same as a current state of the mobile radio device; and
comparing the voice input with voice commands having no specific state allocated.

* * * * *